Nov. 6, 1934.　　　T. A. MITCHELL　　　1,979,279
METHOD OF TREATING ORE MATERIALS
Filed Feb. 18, 1932
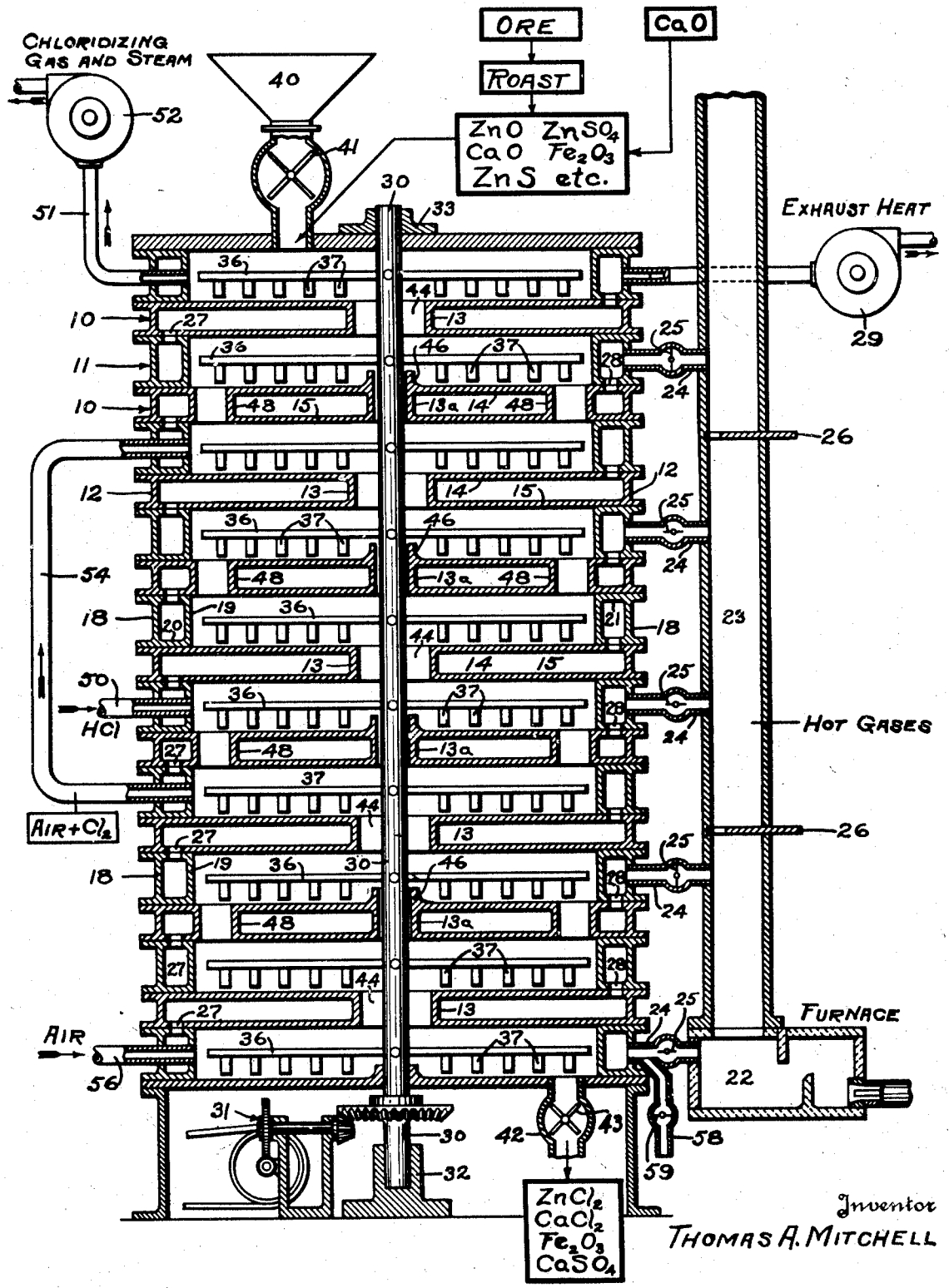

Patented Nov. 6, 1934

1,979,279

UNITED STATES PATENT OFFICE 1,979,279

METHOD OF TREATING ORE MATERIALS

Thomas Austin Mitchell, Denver, Colo., assignor, by mesne assignments, to Hughes-Mitchell Processes, Incorporated, Denver, Colo., a corporation of Wyoming Application February 18, 1932, Serial No. 593,931

21 Claims. (Cl. 75—67)

This invention relates to a method of treating ore materials, and more particularly to the solubilizing of an ore metal value by treating it in a substantially dry condition with a gaseous reagent. This invention is specifically applicable to the production of zinc chloride from a roasted zinc sulfide ore, and particularly an ore containing pyrites, where the production of ferric chloride is desired.

Various chemical reactions required for manufacturing a deliquescent compound involve the presence of water or the formation of water during the reaction, and in certain cases the presence of any considerable amount of water may prevent or hinder the completion of the process. The manufacture of zinc chloride by passing hydrochloric acid gas over zinc oxide is an example of such a case. In this reaction, for each 65 pounds of zinc treated, there will be 36 pounds of water produced and the presence of this large proportion of water is found to prevent access of the reagent gas to the oxide being treated.

A complex zinc-bearing sulfide ore may have its various metal values recovered therefrom by a series of operations which involve roasting the ore and then chloridizing it with hydrochloric acid gas. If the percentage of zinc in the ore is low, the inert materials in the ore, such as quartz and various silicates making up the ore gangue, may physically absorb some of the water and thus leave the ore material in a substantially dry condition so that chloridizing action will take place properly. If, however, the zinc content is very high, the conditions are found to be different. If, for example, a 20% zinc ore is chloridized, there are approximately 800 pounds of zinc chloride and 200 pounds of chemical water mixed with 1600 pounds of inerts for each ton of material being treated. The inert materials are incapable of absorbing all of this large proportion of water and consequently, the zinc chloride is free to absorb some of it. Zinc chloride is highly deliquescent and takes up the available water at normal temperatures, forming a syrupy, viscous mass. The ore particles, in order that their metal values may be fully reached by the hydrochloric acid gas, should be not only finely divided but also porous in nature so as to present a large surface area for attack. The syrupy zinc chloride not only coats the surfaces but also enters the pores of these particles and closes them both to the egress of water vapor therefrom as well as to the access of hydrochloric acid thereto. Heating the syrupy material to dry it will produce a viscous mass changing to a solid glassy-like condition in still closer contact with the surfaces of the particles. Moreover, the chloridizing operation is normally aided by a constant stirring of the ore particles, but when the zinc content is high, the syrupy material tends to stick the ore particles together and results in balling up the material as large lumps which are not easily penetrated by the gas. Consequently, it is not possible to completely chloridize such a high zinc roasted ore by this particular process, unless it is so carried out as to remove the water from the zone of reaction as fast as it is formed.

As a further consideration, the common zinc-bearing ores contain iron sulfide which, during a roasting operation, may be converted to ferric oxide. It may be desirable to recover both the zinc and the iron as chlorides, or the iron chloride alone. Also, in accordance with a process heretofore developed, this ferric oxide may be converted to ferric chloride and the chlorine atom thereof removed and put to useful work in chloridizing the difficultly treated portions of the ore. Ferric chloride, however, dissociates in the presence of oxygen at a temperature at which water boils, so that if the material is heated during the chloridizing operation to eliminate the water of reaction, then the ferric chloride will not be formed as is required.

It is accordingly the primary object of this invention to provide a method of treating ore materials in a substantially dry condition by a gaseous reagent which acts in the presence of or develops water of reaction and preventing deleterious effects arising from the presence of the water.

A further object is to so treat a granular ore material which contains or develops a deliquescent compound, such as zinc chloride, that gaseous reagents may readily permeate the material and closure of the pore spaces will be prevented.

Another object involves the treatment of complex ore materials containing zinc and iron compounds, whereby the zinc may be recovered as a chloride and the iron may serve as a primary chloridizing agent and an efficient recovery of the values may be had. Other objects will be apparent in the following disclosure.

In order that the invention may be fully understood, reference is to be had to the accompanying drawing which diagrammatically illustrates both the method and an apparatus suitable for chloridizing a pyritic zinc sulfide ore concentrate having a high content of zinc, the figure showing in cross-section and somewhat diagrammatically the arrangement of parts of an apparatus which is suitable for carrying on the process. From this illustration and the following description, it will be apparent to one skilled in the art how this invention may be applied to the manufacture of various other chemical compounds.

In accordance with one aspect of this invention, which relates to chloridizing a zinc and iron sulfide ore after it has been roasted, hydrochloric acid gas is utilized for reaction with the metal oxides and the materials are maintained in a finely divided, substantially dry condition during the process. To accomplish this, the chemical water of reaction is removed continuously as fast as it is formed so as to prevent its dissolving any soluble salts therein. This is done by carrying on the reaction at a temperature above the boiling point of the water or of any salt solution present and under conditions which result in the ore material remaining substantially dry or dehydrated, whereby the zinc chloride which is formed cannot clog the pores of the ore particles or cause them to form lumps and so hinder the access of the hydrochloric acid gas to the zinc oxide.

As a further feature of this invention, the step of chloridizing iron oxide with hydrochloric acid gas is carried on in the absence of oxygen or atmospheric air and under controlled conditions so that the temperature of the ore material may be maintained above that point at which iron chloride would normally dissociate in the presence of oxygen. To accomplish these ends, a muffle construction is utilized for indirectly heating the ore materials while they are being treated, so that the temperature of the reaction zone may be maintained well above the boiling point of water without permitting access of oxygen or undesired products of combustion to the reaction chamber. The maximum temperature may be controlled as desired but if it is raised to a point above the vaporization point of any of the ore ingredients, suitable provision will be made to care for the vapors thus formed, as will be hereinafter explained. Of course, the temperature will be kept below that of fusion of any of the ore ingredients or below that point at which harmful reactions might occur.

Referring now specifically to the drawing, the process of treating a sulfide ore containing zinc and iron will be described. Assuming that the ore material has been bulk concentrated, whereby a considerable proportion of the quartz and other siliceous materials has been removed and the zinc content has been raised to a high percentage, this sulfide ore may now be roasted in a finely divided condition in accordance with various procedures to form zinc oxide and ferric oxide. The roasting operation may be so carried on as to prevent the formation of zinc sulfate, or special treatment may be given to the roasted ore to eliminate this sulfate radical during a later stage and prevent zinc sulfate from appearing in the final product. It is to be noted that it is possible to roast a sulfide ore autogenously or at a comparatively low temperature and thus reduce the tendency for the ore particles to sinter or to fuse together since the chloridizing step will effectively take care of any residual sulfides as well as sulfates in the roasted material.

The roasted ore may contain zinc oxide and ferric oxide, and possibly the sulfate, ferrate or silicate of zinc, as well as the inert materials making up the gangue, the unroasted ore materials and various other refractory or difficultly chloridized portions of the ore. If desired, calcium oxide or chloride, or other suitable alkaline earth metal compound capable of and proportions for reacting preferentially with the available sulfate radical and fixing it as an insoluble sulfate, may be added to the roasted material. The amount added is preferably equivalent to the available sulfate radical which is present or which may be developed during the chloridizing stage, so that the zinc will be compelled to go to the chloride form and cannot form a sulfate. The alkaline earth metal sulfate is insoluble in water and so carries the sulfate radical out of the reaction zone as an insoluble compound.

The chloridizing step in the process involves converting the zinc oxide to zinc chloride and hydrochloric acid gas is preferably employed therefor. A zinc carbonate ore will be treated similarly in this process. If it is desired to chloridize the iron oxide as well, then the roasted ore material may be treated in a finely divided condition and while being agitated to the action of hydrochloric acid gas which is in quantity sufficient to react first with all of the zinc oxide and then with such portion of the ferric oxide as it is required to convert to the chloride. If it is not intended to form ferric chloride, then the hydrochloric acid treatment will be cut off short of converting all of the zinc oxide to the chloride condition, since ferric chloride is not stable in the presence of zinc oxide and it, therefore, will not be formed until substantially all of the zinc oxide has been satisfied. If a complex ore containing zinc ferrate, sulfide, silicate or other refractory or difficultly chloridized materials is being treated, chlorine gas may be employed in a subsequent step to convert these to chlorides. The chlorine may be obtained from an outside source and particularly where there is no iron in the ore, but if the latter is present, then it is preferred to form some ferric chloride and to decompose this material and develop chlorine therefrom at a later stage in the process. In this case, the nascent chlorine will be in intimate association with the ore material and so be capable of reacting easily with various refractory compounds. If calcium chloride or calcium oxide is present, then during this final stage the alkaline earth metal will combine with all available sulfate radical and form alkaline earth metal sulfate which is substantially insoluble in water and may, therefore, be easily separated from the soluble zinc chloride. The available sulfate radical is derived from the zinc sulfate in the roasted ore, if any, or from the residual zinc sulfide which remained in the ore after roasting, it being understood that the nascent chlorine tends to form sulfur chloride which will be converted to sulfur trioxide in the presence of ferric oxide acting as a catalyzer.

A suitable apparatus for these various stages of absorbing the hydrochloric acid gas and of finishing the material by converting the ferric chloride to ferric oxide and nascent chlorine may be of the type illustrated diagrammatically in the drawing. As there shown, this apparatus may comprise a series of reaction chambers, within each of which the roasted material may be stirred while it is being acted upon by the reagent, after which it is fed gradually downwardly to the next chamber for further action. These chambers are heated indirectly by a surrounding set of muffle units which comprise hollow hearths and annular chambers internally heated by a suitable medium. Each of these muffle units is so connected to an outside source of heat that the temperature in each stage of the process may be separately regulated, whereby the reaction may proceed under controlled conditions.

The entire absorption and finishing apparatus may be made up as a single structure comprising a series of two separate muffle units, the hearth 10 and the annular body 11, which are herein illustrated in simple constructional forms. The hearth comprises a disk-shaped hollow iron casting having an outside cylindrical wall 12 and an inner cylindrical wall 13 connected by the top and bottom plates 14 and 15 respectively. The top and bottom plates may extend beyond the outer walls so as to provide flanges for bolting the various parts together. The annular muffle unit 11 similarly comprises two cylindrical walls 18 and 19 connected by top and bottom walls 20 and 21 so as to form a hollow annular chamber.

These units are piled up on one another, as illustrated, to form a series of reaction chambers surrounded by hollow heat units. These hearths and annular chambers may be heated by any suitable medium, such as electrical resistance units or steam pipes, but in the present case, they are illustrated as connected to an oil or gas fired furnace 22 having a stack 23 for the exit of the products of combustion. Certain of the annular muffle chambers are connected, as illustrated, by means of pipes 24 with the furnace and the stack; suitable openings being provided in the walls of the annular chambers for this purpose. Each of these connecting pipes 24 is provided with a damper 25, and the stack has suitable dampers 26, whereby the flow of hot gases to and from the muffle chambers may be controlled. In order to provide inter-communication between the inner spaces of the hearths and annular muffle chambers, the openings 27 and 28 are provided in the top and bottom plates of the various units, whereby heated gases may travel from the lowermost pipe 24 into the bottom annular muffle, then around this annular chamber and through an opening 27 into the hollow hearth and then around the central wall 13 to the opposite side of the chamber where the gases pass through the opening 28 into the next annular chamber thereabove. The gases may travel throughout the entire length of the apparatus, or by suitably regulating the stack dampers 26 and the dampers 25, the gases may be by-passed or their flow through the chambers may be properly controlled so that that the temperature conditions, having due regard to the heat of reaction, may be as desired at the various stages of the process. An exhaust fan 29 may be employed to aid the circulation of the hot gases through the muffle units.

In order that the material may be fed back and forth through the series of chambers, a suitable stirring device is provided. In the present case, this comprises a shaft 30 which is suitably rotated by a driving apparatus 31 located at the bottom of the machine. The shaft is properly supported in bearings 32 and 33 at the bottom and top of the device. It passes centrally and vertically through the apparatus and through central openings in the hearths. The shaft carries a series of horizontal arms 36 in the reaction chambers, each having rakes or teeth 37 thereon which depend to a position close to the top surface of the hearth. The rakes comprise flat paddle-shaped members which are so arranged that one set of rakes on an arm will follow in a path between the paths of the rakes on the adjacent arms and so stir the material constantly. These flat paddles will be arranged at such angles that they will feed the material radially outwardly or inwardly as the shaft revolves.

The roasted ore will be fed through a suitable inlet device 40 at the top of the machine, which may include a rotary paddle feeder 41 adapted to prevent the exit of gases from the apparatus as the material enters. Similarly, at the bottom of the machine is an exit 42 having a rotary paddle 43 for the same purpose. The material entering the pipe 40 feeds onto the upper hearth 10 and the rake arms are so positioned that as the shaft revolves, the material will be moved inwardly and be caused to pass downwardly through the central opening 44 into the next reaction chamber.

It will be observed that the alternate hearth chambers 10 differ, in that the top one of the series has the inner cylindrical walls 13 of large diameter while the next one below has its walls 13a of small diameter and closely surrounding the shaft 30. Suitable upstanding flanges 46 are provided on these walls 13a to prevent material from escaping downwardly past the shaft. This second hearth chamber having the wall 13a is likewise provided with openings formed by tubular walls 48 interconnecting the top and bottom 14 and 15, whereby the material fed into this second muffle chamber may be raked outwardly by the teeth 37 and be caused to pass downwardly through the openings formed by the tubes 48 into the third muffle chamber. Here, the rake arms are arranged to move the material inwardly and cause it to escape through the central opening 44 around the shaft to the next chamber, and so on down through the apparatus.

At an intermediate point in the apparatus, a pipe 50 is provided which opens directly into the reaction chamber and serves for introducing strong hydrochloric acid gas for chloridizing the iron oxide on the lower hearths and the zinc oxide on the upper ones. An outlet pipe 51 connected with the top reaction chamber and an exhaust fan 52 serves to create a reduction in pressure for drawing the gas and reaction products upwardly and finally outwardly from the apparatus. A pipe 54 may also connect the reaction chamber immediately below the one into which the hydrochloric acid gas is introduced with a chamber nearer the top of the apparatus, as shown. This pipe is for the purpose of by-passing chlorine gas and any excess air present therein, so that it will not mingle with the fresh, strong hydrochloric acid gas or contact with the ore at a point where ferric chloride is being formed. It will be understood that the reduced pressure within the machine will cause the chlorine gas to be thus by-passed around the point where the hydrochloric acid gas is at its fullest strength. At the bottom of the apparatus, a further pipe 56 serves for introducing air into the lower reaction chamber.

In accordance with this invention, the entire series of reactions is carried on at a temperature above the boiling point of water or any salt solution which may be formed in the apparatus. As the finely divided roasted material enters the top chamber, it meets weak hydrochloric acid and chlorine gases passing in counterflow relation thereto, and the zinc oxide is gradually converted to zinc chloride. Any calcium oxide present will also go to calcium chloride. As the material travels downwardly through the apparatus, it meets stronger hydrochloric acid and after the zinc oxide has been substantially wholly satisfied, then the ferric oxide will be chloridized.

The temperature being held above the boiling point of water, the chemical water of reaction is immediately vaporized and the steam drawn off with the excess chloridizing gas through the outlet pipe 51. Consequently, the water is removed as fast as it is formed and so cannot combine with the zinc chloride to form a syrupy viscous mass which would permeate the pores and coat the particles of the ore material. The water is thus vaporized throughout the entire process as the ore travels from the inlet to the outlet of the apparatus. At the point where the ferric chloride forms, the temperature is above that at which ferric chloride would decompose in the presence of oxygen to form ferric oxide and nascent chlorine, but this cannot take place since the atmosphere is substantially devoid of air. Consequently, the ferric chloride will be produced above the temperature of its normal decomposition point.

If it is desired to retain the ferric chloride and not to break it up, then no air will be introduced through the pipe 56 and the lower portion of the apparatus will be cooled instead of heated. In that case, the lowermost muffle pipe 24 will be connected with a suitable cooling medium, such as cold air, which will serve to reduce the temperature to below 100° C. in the bottom of the machine, at which the ferric chloride is stable in the presence of air. This may be effected by means of the pipe 58 and valve 59. The upper valves 25 will, of course, be regulated to heat the middle of the apparatus as above described. It will, therefore, be understood that this invention applies to the formation of either zinc or iron chloride, or both, or to the decomposition or the recovery of the iron chloride, depending upon whether it is intended to use the latter to aid in the recovery of the refractory or difficultly chloridized portions of the ore.

In the present case, where zinc sulfide and probably zinc silicate, zinc ferrate and other refractory materials are present, it is desired to utilize the ferric chloride for bringing these to a soluble form. For this purpose, air is introduced through the lowermost pipe 56 into contact with the ferric chloride and the temperature in the lower muffle zones is maintained at 250° to 300° C. or higher. At this high temperature and in the presence of oxygen, the ferric chloride reacts with the oxygen to form nascent chlorine and ferric oxide. The nascent chlorine being in intimate contact with the ore material converts zinc sulfide and other refractory compounds to zinc chloride with the formation of sulfur gases which are taken up by the calcium chloride, as above explained. Any excess of chlorine and air is preferably by-passed through the pipe 54, as shown, so that the excess of air which may be present will not dilute the hydrochloric acid or decompose the ferric chloride. If, however, any ferric chloride is decomposed, the nascent chlorine will be put to work in treating the refractory materials at that point, so that no chlorine will be lost. It will also be understood that if the temperature is maintained above the volatilization point of the ferric chloride, then the fumes thereof will escape into the upper cooler part of the apparatus and be condensed and thus captured. The top muffle chambers may be kept comparatively cool although above the vaporizing point of water so that these ferric chloride fumes will be caught.

It will be understood that the materials resulting from this chloridizing process may be suitably treated as desired. The zinc chloride is soluble in water and may be separated from the ferric chloride, calcium sulfate and other insoluble materials making up the gangue by this simple expedient of leaching the chloridized material with water. If zinc and iron chlorides are both formed, then they may be leached from the mass and separated afterwards by procedures well known in the art.

It will now be apparent that various modifications may be made in this process within the scope of this invention. For example, chlorine gas may be derived from other suitable sources besides ferric chloride, and particularly where iron is not present in the ore, for the purpose of chloridizing the difficultly treated portions thereof. In that case, chlorine will be introduced through the pipe 56 instead of air, as above explained.

The process is applicable to the manufacture of many deliquescent materials, of which zinc chloride has been given as an example. It is useful where any metal compound, such as a carbonate, is to be treated with an acid and the chemical water of reaction formed should be removed continuously. It may be employed for manufacturing such materials as ferrous or ferric chloride alone or the chlorides of such metals as copper and manganese, where high temperature conditions may be advantageous, but where the moisture content and other characteristics of the atmosphere surrounding the material should be so controlled that the substances will not be affected detrimentally thereby. In such cases, various reagents may be employed for the reaction and since the material is heated indirectly, then the nature of the atmosphere as well as the concentration of the reaction gases may be controlled as desired. It is, therefore, apparent that the claims should be construed broadly in view of the above disclosure. The apparatus herein described is claimed in my copending application Serial No. 593,932, filed February 18, 1932.

The invention claimed is:

1. The method of chloridizing an ore containing a high content of zinc sulfide comprising the steps of roasting the ore in a finely divided condition to form zinc oxide and leaving residual sulfide sulfur therein, chloridizing the roasted material by means of hydrochloric acid while maintaining the material at a temperature below the volatilization point of zinc chloride but above the boiling point of water to vaporize the chemical water as fast as it is formed, and thereafter treating the material with chlorine gas in the presence of an alkaline earth metal compound capable of and proportioned for reacting with all available sulfate radical and preventing the formation of zinc sulfate, whereby substantially the entire content of zinc sulfide is converted to a chloride.

2. The method of chloridizing an ore containing zinc and iron sulfides comprising the steps of roasting the ore to produce zinc and ferric oxides together with other compounds including unroasted material, chloridizing the zinc oxide and some of the ferric oxide by means of hydrochloric acid, maintaining the material throughout the treatment at a temperature below the volatilization point of ferric chloride but above the boiling point of water and removing the chemical water as a vapor as fast as it is formed, while excluding oxygen from the atmosphere in the reaction zone, thereafter heating the material in the presence of oxygen to a temperature at which the ferric chloride will be converted to ferric oxide with an evolution of nascent chlorine, and causing said chlorine to chloridize residual zinc compounds in the presence of an alkaline earth metal compound capable of and proportioned for reacting with the available sulfate radical and preventing the formation of zinc sulfate, whereby substantially all of the zinc content of the ore may be recovered as a chloride.

3. The method of chloridizing a complex ore material containing zinc and iron oxides and other chloridizable ore values comprising the steps of treating the material in a finely divided condition with a gas comprising hydrochloric acid and converting the zinc and iron oxides to the chlorides, while maintaining the temperature above 100° C. but below the volatilizing or fusion points of the ore ingredients and preventing the admission thereto of a material amount of air, so as to provide iron chloride in intimate association with the chloridizable ore values, and thus prevent the closure of the pores between the ore particles by deliquescent or fused ingredients and maintain the ore material in an open and gas-permeable condition, and causing the iron chloride to chloridize ore values within said material.

4. The method of the preceding claim in which the ore material containing the iron chloride is heated with air to a temperature at which any iron chloride present is not stable and ferric oxide is formed therefrom, together with a gaseous chloridizing reagent.

5. The method of claim 3 in which the ore material is heated with air to produce ferric oxide and chlorine, and in which the resultant gases are prevented from contacting with the ore material during the stage of forming the iron chloride.

6. The method of treating a roasted complex sulfide ore containing zinc and ferric oxides and residual sulfides comprising the steps of treating the ore material at a temperature above 100° C. with chloridizing gases to form zinc chloride while maintaining the ore material in a substantially dry and gas-permeable condition, thereafter treating the ore material with strong hydrochloric acid gas and in the absence of any material amount of air, while maintaining the temperature above 100° C. but below that point at which iron and zinc chlorides will volatilize or fuse, and producing ferric chloride in intimate association with a substantially dry, gas-permeable ore material, and causing the ferric chloride to convert residual sulfides to chlorides.

7. The method of claim 6 in which the ore material containing zinc and iron chlorides is heated with air to a temperature at which ferric oxide and nascent chlorine are formed and the ore material is further chloridized by said chlorine.

8. The method of chloridizing a complex high grade zinc ore material containing a high content of zinc oxide and ferric oxide and other chloridizable ore values comprising the steps of treating the material in a granular condition with a gas containing hydrochloric acid to convert zinc oxide to the chloride, while maintaining the material at a temperature above 100° C. and continuously removing the chemical water vapor from the reaction zone, so that the water can exist only as vapor and the deliquescent zinc chloride cannot cause closure of the pores in the ore material, and thereafter treating the ore material with strong hydrochloric acid gas in the absence of a material amount of air and providing ferric chloride in intimate association with the chloridizable ingredients of the ore material, while maintaining a temperature above 100° C. but below that at which the iron chloride is decomposed by heat, and thereafter heating the ore material with air to convert the iron chlorides present to ferric oxide and nascent chlorine and thereby chloridize other ore values, and thereby forming zinc chloride while maintaining the ore in a granular, gas-permeable condition throughout the process.

9. The method of chloridizing an ore material containing a high content of zinc oxide comprising the steps of passing the ore material in a finely divided condition in counterflow relation to a current of hydrochloric acid gas, agitating the material continuously, heating it indirectly during the chloridizing treatment, while preventing access of the heating medium thereto and thereby controlling the composition of the atmosphere of the reagent gas and maintaining the temperature thereof in the vicinity of but above 100° C. to vaporize the chemical water as fast as it is formed without causing volatilization of the zinc chloride or detrimental reactions in the ore material, thus maintaining the material in a substantially dry condition, and thereafter dissolving the zinc chloride and thus separating it from the ore material.

10. The method of treating a granular ore material containing a metal oxide comprising the steps of passing the material progressively through a series of intercommunicating reaction zones, introducing into a later stage zone a gaseous acid reagent capable of forming a salt of said metal and chemical water and passing said gas in a counterflow relation to the ore material, heating the reaction zones independently of the reagent gas and without diluting or modifying the same by a heat transfer medium, and maintaining the ore material at such a temperature in the vicinity of 100° C., relative to the rate of gas flow, that the chemical water is vaporized and removed from the reaction zones and the ore material is held in a substantially dry condition during the reaction.

11. The method of claim 10 in which an ore material containing a high content of zinc oxide is treated with hydrochloric acid gas and the deliquescent zinc chloride thus formed is prevented from dissolving in the chemical water.

12. The method of chloridizing a granular, gas-permeable ore material containing a high content of zinc oxide comprising the steps of passing the material in a counterflow relation to a gas current containing hydrochloric acid and forming zinc chloride therein, heating the incoming ore material independently of the reagent gas by a heat transfer medium which does not dilute or modify the reagent gas and maintaining a temperature above 100° C. but below the point at which the zinc chloride or other ore ingredient can fuse or cause closure of the ore material, and removing the chemical water from the reaction zone as vapor and thus preventing the deliquescent zinc chloride from absorbing the same and forming a mass which is not readily permeated by the gas.

13. The method of treating an ore material containing zinc and iron oxides according to claim 12 which comprises the further step of treating the ore material with strong hydrochloric acid gas after the major portion of the zinc chloride has been formed and producing iron chloride in intimate association with the ore material under a temperature condition which prevents chemical water from condensing on and wetting the material but which leaves said chlorides therein.

14. The method of chloridizing an ore material containing zinc and iron oxides according to claim 12 in which the ore material is thereafter treated with strong hydrochloric acid gas and in the absence of a material amount of air under a temperature condition which results in the production of iron chloride within a substantially dry, granular ore material, and thereafter heating the ore material with air to convert the iron chloride to ferric oxide and produce a gaseous chloridizing agent in intimate association with the ore material.

15. The method of claim 14 in which the final gases are by-passed around the zone in which the iron chloride is treated with the strong hydrochloric acid gas and are caused to chloridize the incoming ore material.

16. The method of chloridizing a complex sulfide ore containing iron sulfide and other chloridizable values comprising the steps of roasting the ore with air to remove sulfide sulfur and providing a granular material containing iron oxide, thereafter treating the material with strong hydrochloric acid gas from which any material amount of air has been excluded to form iron chloride, while maintaining it at a temperature above 100° C. but below that point at which the iron chloride will dissociate under the conditions of the process, and thereby producing an ore material containing iron chloride intimately associated with the ore values for chloridizing the same, whereby the material will be maintained in a substantially dry condition and water of reaction cannot condense on the ore, and thereafter separating the chloridized metal values from the iron compounds.

17. The method of claim 16 in which the ore material containing the iron chloride is heated with air to form ferric oxide and a gaseous chloridizing agent and the resultant gases are prevented from access to the ore material during the step of forming the iron chloride.

18. The method of claim 16 in which the ore is roasted to produce ferric oxide and the treatment with hydrochloric acid gas produces ferric chloride in intimate association with the ore material, and in which any iron chloride present is thereafter converted to ferric oxide and nascent chlorine by heating the ore material with air, and the resultant gases are excluded from the zone where the ferric chloride is formed.

19. The method of chloridizing a roasted sulfide ore material containing zinc and iron oxides, residual sulfides and other refractory ingredients comprising the steps of passing the ore material in finely divided condition progressively through a series of intercommunicating reaction zones, passing through the first zone a countercurrent of reagent gas containing hydrochloric acid and thereby converting the zinc oxide to zinc chloride, while heating the material to a temperature at which the chemical water is removed as vapor and causing the ore material to remain in a substantially dry, gas-permeable condition, then treating the ore material in a second zone with strong hydrochloric acid and converting the iron oxide to a chloride, while maintaining temperature conditions above 100° C. which provide a granular, substantially dry and gas-permeable ore material, and thereafter heating the ore material with air in a final chloridizing zone to convert any iron chloride present to ferric oxide and thereby develop a gaseous chloridizing agent in intimate association with the ore material, and transferring heat from the last zone to the incoming ore in the first zone to prevent condensation thereon of the chemical water.

20. The method of chloridizing an ore material containing ferric oxide and other chloridizable ore values comprising the steps of agitating and treating the ore material with strong hydrochloric acid gas from which any material amount of air has been excluded to form ferric chloride, while maintaining the material at a temperature above 100° C. but below that point at which the ferric chloride will dissociate under the conditions of the process, and thereby producing an ore material containing ferric chloride intimately associated with the ore values, causing said values to be chloridized by the ferric chloride, and thereafter separating the iron compounds and gangue from the ore metal chlorides.

21. The method of claim 20 in which the ore material containing the iron chlorides is heated with air to form ferric oxide and a gaseous chloridizing agent and the resultant gases are prevented from access to the ore material during the step of forming the iron chloride.

THOMAS AUSTIN MITCHELL.